June 16, 1942.  H. BOHNSTEDT  2,286,710
HUMIDITY RESPONSIVE INSTRUMENT
Filed Dec. 19, 1938

Inventor,
Herbert Bohnstedt,
By A. D. Adams
atty.

Patented June 16, 1942

2,286,710

UNITED STATES PATENT OFFICE 2,286,710

HUMIDITY RESPONSIVE INSTRUMENT

Herbert Bohnstedt, Berlin, Germany, assignor to Askania-Werke A. G., a corporation of Germany Application December 19, 1938, Serial No. 246,687
In Germany December 22, 1937

3 Claims. (Cl. 297—1)

This invention relates to improvements in or relating to humidity responsive instruments of the kind comprising a membrane or ribbon- or bank-like measuring member responsive to humidity.

The invention aims to improve the well-known instruments of this kind with respect to the measuring member. Hitherto a membrane out of Cellophane, inverted cellulose, artificial silk and the like was used. The main object of the invention is to use hygroscopic lacquer or varnish film, preferably a film of nitrated cellulose e. g., bi- or tri-nitro-cellulose, as measuring member.

A further object of the invention is to improve the customary suspension of the measuring member.

Furthermore the invention aims to improve the process for producing the new film according to the invention by artificially aging the film so as to exclude from the beginning an offset of the measuring range due to the natural aging of the film.

Figure 1:
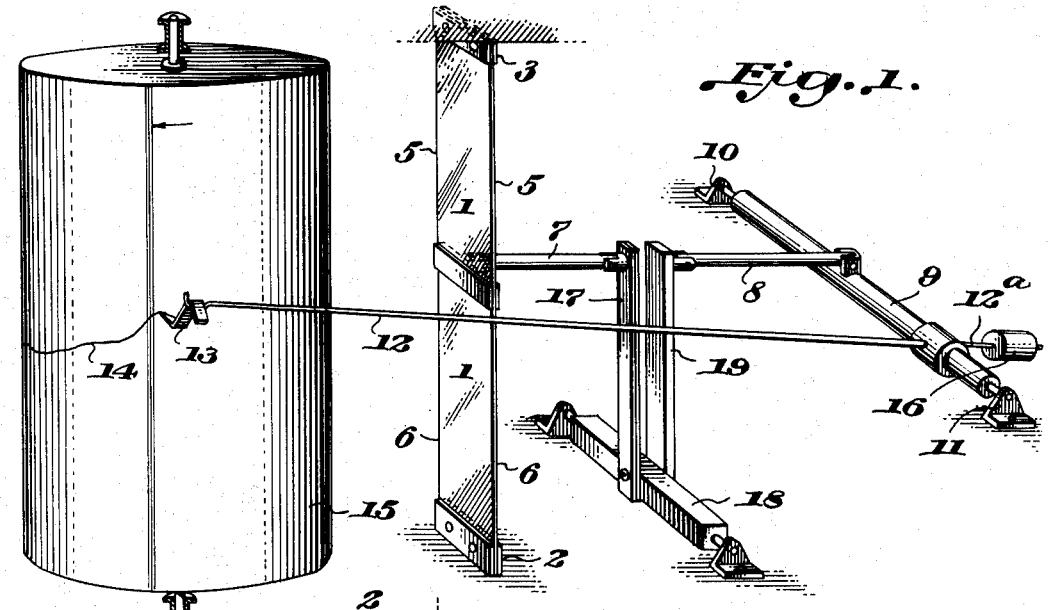

Other aims, objects and advantages will be more fully explained in the following description with reference to the accompanying drawing, in which Fig. 1 is a perspective view of a humidity responsive instrument, showing the essential parts of it and comprising the new film according to the invention.

Figure 2:
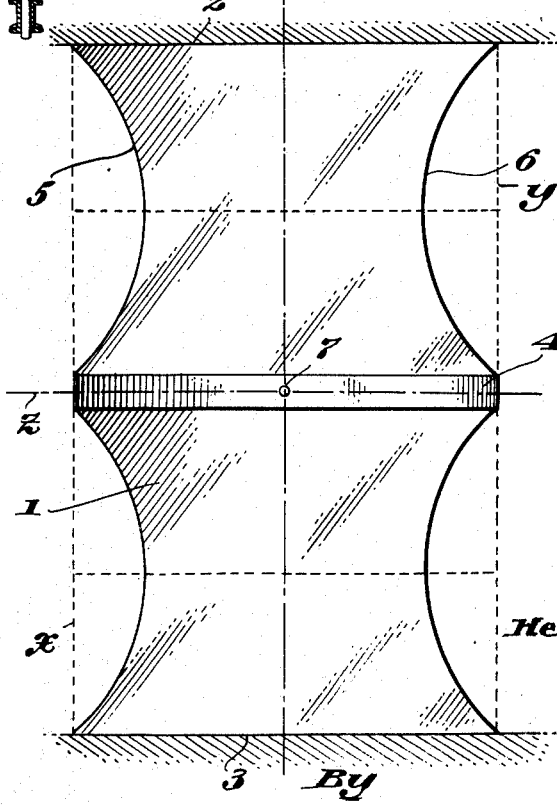

Fig. 2 is a plane view of the new film showing a modification with respect to the film contour.

Referring now to Fig. 1:

I is a membrane of a humidity indicating instrument. This membrane is connected by means of two rods 7 and 8 to an indicator axis 9 rotatably mounted as at 10 and 11. The axis 9 is provided with an indicator or pointer 12 supporting a pen 13 for recording in a well-known manner the curve 14 on a recording strip mounted on a drum 15 which is rotatable by any convenient means as for instance a clockwork.

Upon an increase in humidity the surface or length of the membrane I likewise increases, thereby increasing the sag so that the axis 9 is rotated by means of the rods 7 and 8 in a clockwise direction and the pointer 12 will be lifted. Accordingly the pointer 12 will drop as soon as the humidity decreases and, therefore, the membrane I will contract.

From the foregoing it follows that means should be provided for creating an initial tension in the membrane I. For this purpose in the embodiment shown in Fig. 1 the pointer 12 is provided with an extension 12a for receiving a weight 16. Of course, this weight may be replaced by a spiral spring acting directly upon the pointer axis or shaft 9.

The rods 7 and 8 may be directly connected with one another. However, it is advisable to provide temperature compensating means comprising, according to the embodiment shown in Fig. 1, a bimetal strip 17, one end of which is fastened to a rotatably mounted supporting shaft 18, whilst the other end is hinged to the transmitting rod 7. The second transmitting rod 8 is hinged to a rigid lever arm 19 likewise fastened to the supporting shaft 18. Obviously this compensating device operates in such a manner that upon a movement of the first transmitting rod 7 due to a change in humidity (moisture) the supporting shaft 18 will be rotated. This rotation will be transmitted to the second rod 8 by means of the rigid arm 19. The arrangement of the bimetal strip 17 is such that upon an increase in temperature the strip is bent so as to decrease the distance from the rigid arm 19. Otherwise an increase in temperature results in an additional extension or dilatation of the membrane I. This additional extension or dilatation would falsify the humidity indication, if this additional influence due to the temperature were not compensated by a decrease of the distance between the bimetal strip 17 and the rigid arm 19. In this way the temperature has no influence on the humidity indication, i. e. on the position of the pointer shaft 9 and the pointer 12. As long as the humidity does not change, any decrease or increase of the temperature cannot produce a rotation of the pointer shaft 9.

According to the present invention, in such a well-known humidity responsive instrument a hygroscopic lacquer film should be provided as membrane I. Preferably a film of nitro-cellulose serves as membrane.

As shown in Fig. 1, the ribbon-like lacquer film I is fixedly clamped at both ribbon ends 2 and 3 and provided in the middle with a bridge 4 out of a thin, hard light metal which extends over the entire ribbon width and to which is hinged the above-mentioned first transmitting rod 7.

Referring now to Fig. 2, the two longitudinal free edges 5 and 6 of the film take a catenary-like course in order to avoid a sag of these edges. It is to be noted that instead of a catenary curve the free edges 5 and 6 may be formed according to any other course. However, it is essential that the ribbon width of the film between the free longitudinal edges 5 and 6 should be smaller within the range of the dotted lines x and y (see Fig. 2), i. e. in the middle between the dotted line z intersecting the engaging point of the first transmitting rod 7 and each of the clamped edges 2 and 3, respectively.

Of course, in case of a really narrow ribbon as shown in Fig. 2 such a form of the longitudinal free edges 5 and 6 may be dispensed with, because the longitudinal free edges of a narrow ribbon do not tend to sag. A hygroscopic lacquer or varnish film, especially a film of weakly nitrated cellulose guarantees an indicating exactness of ±1%. The solutions of the nitrated cellulose are sold, for instance as zapon enamel. As compared with the well known films (for instance Cellophane, inverted cellulose, artificial silk and the like) such a lacquer film is furthermore distinguished by suppleness and freedom from creases and by immediate response to changes in humidity. The well known films used hitherto achieve under the most favourable conditions an indicating exactness of only about ±3%. Furthermore it may be pointed out that the lacquer film according to the invention has a linear hygroscopic characteristic in the range of 15 to 100% and preserves this characteristic in case of very difficult operating conditions, as for instance in case of erection in the open air.

In deviation from the customary suspensions of the membrane, according to the invention, the ribbon-like lacquer film is fixedly clamped at both ribbon ends and connected at the centre to the movement transmitting system, as shown in the embodiment according to Fig. 1 as rods 7 and 8.

The lacquer film itself may be produced in the well known manner by applying, for instance by spraying the nitrated cellulose on an applying surface and by afterwards detaching the lacquer film therefrom.

In order to exclude from the beginning an offset of the measuring range due to natural aging it is advisable to artificially age the lacquer film thus produced. The film may be saturated with humidity for this purpose and afterwards dried. For the saturation the film may be placed into a water bath of about +176° F. for about 3 hours and afterwards in any convenient drying apparatus for about 20 hours at about +122° to 140° F.

Preferably this aging process will be repeated several times in order to be certain to conclude the artificial aging. During this process a shrinking of the lacquer film is avoided if a temperature of 176° F. is not surpassed.

It may be pointed out that the embodiment represented in the drawing may be modified so as to use the lacquer film as circular membrane clamped all around. In this instance the bridge 4 is replaced by a disc which should not be too small, as otherwise a permanent deformation of the membrane at the connecting point of the transmitting rods must be apprehended With respect to the remaining construction of the hygrometer or hygrostat any modification is not necessary when using the new film according to the invention. This is also true of any auxiliary compensating device as shown in Fig. 1. In spite of this the present invention is in no way restricted to the particular embodiment shown and described, but may also be modified in any convenient manner without departing from the spirit of the invention as defined in the appended claims.

What is claimed is:

1. A humidity responsive device comprising, a lacquer film out of nitrocellulose as humidity responsive measuring member, said film being fixedly clamped at two opposed edges, and a measuring value transmitting system controlled in response to the film transverse movements, said transmitting system being operatively connected to the middle of said film, the width of said film measured in direction of said clamped edges decreasing from said edges and the connecting point of said system.

2. A humidity responsive device comprising, a lacquer film out of nitrocellulose as humidity responsive measuring member, said film being fixedly clamped at two opposed edges, and a measuring value transmitting system controlled in response to the film transverse movements, said transmitting system being operatively connected to the middle of said film, the free unclamped edges of said film being formed according to a catenary curve so that the width of said film at its clamped edges and at the connecting point of said system is greater than in between.

3. A humidity responsive device as claimed in claim 1, in which said film at the connecting point of said transmitting system is provided with a bridge member extending over the entire width of said film substantially parallel to its clamped edges.

HERBERT BOHNSTEDT.